Patented Apr. 15, 1924.

1,490,309

UNITED STATES PATENT OFFICE.

GLOVER M. BIRK, OF INDIANAPOLIS, INDIANA.

TANNIN VEGETABLE GLUE.

No Drawing.   Application filed August 4, 1921.   Serial No. 489,868.

*To all whom it may concern:*

Be it known that I, GLOVER M. BIRK, a citizen of the United States, residing at Indianapolis, in the county of Marion and State of Indiana, have invented a new and useful Tannin Vegetable Glue, of which the following is a specification.

It is the object of my invention to make a vegetable glue more nearly water-proof, and to increase the possible content of the water used in the glue without impairing its sticking qualities, and to make a glue which will have excellent sticking qualities even though it is made relatively thin and easy-flowing.

Vegetable glues have long been made by adding caustic soda to starch and water. The caustic soda has apparently made the starch particles swell up and absorb water, and dissolve to a thick colloidal glue. At a later date the starch in the water was first treated with some oxidizing or hydrolyzing agent, such as sodium peroxide or hydrogen peroxide or sulphuric acid, and was allowed to stand for a considerable time under the action of such oxidizing or hydrolyzing agent, before the addition of the caustic soda. The oxidizing or hydrolyzing agents apparently split up the complex molecules of the starch, so that when dissolved in a given amount of water the solution of glue would be thinner than if the untreated starch were used. Both with and without the oxidizing or hydrolyzing agents, however, it was found desirable to limit the quantity of water used to three parts of water or less to one part of starch, as otherwise the glue would be too much diluted and would not have the desired sticking qualities. This glue was far from water-proof.

Various reagents have at times been added to thicken the starch and make it stiffer and more viscous and capable of being drawn out in threads; among such reagents are borax and the salts of lead.

I have found that by adding tannin to the starch and water at the same time as the caustic soda is added or before, and without the necessity for waiting for any time to elapse after the tannin is added and before the caustic soda is added, I can produce a glue of great flexibility in proportions, permitting a wide range in the content of water, having the essential sticking qualities, and highly water-resisting. I am not sure what the action of the tannin is, but I believe it consists either in making the molecules or colloidal particles or aggregates of the starch shrink, without modifying them save by forcing water out of them, or else in making them combine with one another in new ways with less water in them. Whatever the explanation is, the addition of the tannin makes the mixture thinner in consistency than it would be otherwise, but does so with an increase of the sticking qualities instead of with a decrease thereof, contrary to the old experience that an increase in the thickness of the glue is necessary to get an increase in its sticking qualities. Because of the thinning effect of the tannin, it is possible to make a glue in which only two parts, or less, of water to one part of starch are used, and still obtain a freely flowing and relatively thin glue, of great sticking qualities; and it is also possible to increase the quantity of water to four parts or even more of water to one part of starch, without too greatly impairing the sticking qualities of the glue, although it is then quite thin in comparison with vegetable glues hitherto known. For some purposes this very thin glue which is still strong in making joints is of great advantage.

If it is desired to use a relatively large quantity of water without getting a thin glue, I may add in addition a quantity of some recognized starch thickening agent, such as some of the compounds of the heavy metals, as of tin or zinc or some compound of boron, calcium, or aluminum, as for instance borax or aluminum hydroxide or sodium aluminate. These thickening agents counteract the thinning effect of the tannin to some extent, and make it possible to increase still further the content of water, but they do not interfere with the effects of the tannin in producing greater water-proof and sticking qualities; and they may even add to such sticking qualities.

As already stated, the use of the tannin gives great flexibility in composition. I give below two formulas, with greatly different amounts of water, the one with the lesser quantity of water preferably being made without a thickening agent and the one with the greater quantity of water being made with a thickening agent, though neither the absence nor the presence of such thickening agent is in all cases essential, and depends upon the character of glue desired.

*a.* To 100 parts of starch add about 190 parts of water, and then add 2 parts of tannin, and 10 parts of caustic soda dissolved in 10 parts of water. This makes a total of 2 parts of water to 1 part of starch. This glue can be made without heating, or it can be made with heating and with the quantity of caustic soda reduced very considerably, even to three or four parts; the larger the quantity of caustic soda the lower the temperature at which the glue may be made. The proportionate part of the water which is used for initially dissolving the caustic soda is not essential, and the amount stated is merely given by way of example. This tannin-glue which is made with 2 parts of water to 1 part of starch is not unduly thick, but instead is fairly thin, and can be applied easily and conveniently; although thin it has great sticking qualities and is highly water-resisting.

*b.* To 100 parts of starch add 380 parts of cold water, and then add a sufficient quantity of tannin, which may vary from 1 to 5 parts. If it is desirable to thicken the glue, then add a sufficient quantity of a suitable starch-thickener. The quantity of such thickener will depend upon the compound used. If borax is used, 1/50 of 1 part will be sufficient, but if sodium aluminate is used I find that about 4 or 5 parts give good results; this can be varied at will, according to the thickening effect desired. Then add about 3 parts of caustic soda dissolved in 20 parts of water, thus making a total of 4 parts of water to 1 part of starch. In practice it has been found desirable to mix the caustic soda and sodium aluminate and to add them simultaneously to the glue; such mixture may be made by dissolving about 1½ parts of metallic aluminum in about 20 parts of water containing 7 or 8 parts of caustic soda. As in case *a*, the quantity of water used for initially dissolving the caustic soda may be varied at will, and the quantity of caustic soda may be varied accordingly as the glue is to be made with or without cooking. The quantity given is for a cooked glue, and if an uncooked glue is made this quantity would be somewhat increased, say to 8 or 10 parts. With the proportions given, the mixture is cooked at about 190° F. until all the solids are in solution, and when cooled is the finished glue; which is not too thin and which has excellent sticking and water-resisting qualities.

It is obvious from these two ways, one with twice as much of water as the other in proportion to the starch, that the compound has very great flexibility in proportions. The presence of the tannin appears to have several effects—thinning, water-proofing and increasing the strength even while thinning. Thus the dilution of the glue may be very considerably varied by changing the quantity of water used, and the essential sticking qualities are retained even though an even greater quantity of water is used than is given in case *b*. When it is desired to use a large quantity of water, as for reasons of economy, this may be done while still retaining the sticking qualities and without making the glue thinner than desired, by adding one of the starch-thickening agents in addition to the tannin.

I claim as my invention:

1. A vegetable glue, made of 100 parts of starch, 200 parts or more of water, 2 parts of a tannin, and from 3 to 10 parts of caustic soda.

2. A vegetable glue, made of 100 parts of starch, 400 parts or less of water, 1 to 5 parts of a tannin, 4 or 5 parts of sodium aluminate, and from 3 to 10 parts of caustic soda.

3. A vegetable glue, made of 100 parts of starch, 400 parts or less of water, 1 to 5 parts of a tannin, a starch-thickener, and from 3 to 10 quarts of caustic soda.

4. The method of making vegetable glue, comprising mixing 100 parts of starch in from 190 to 400 parts of water, adding from 1 to 5 parts of a tannin and a quantity of a starch-thickener, and adding from 3 to 10 parts of caustic soda dissolved in water.

5. The method of making vegetable glue, comprising mixing 100 parts of starch in from 190 to 400 parts of water, adding from 1 to 5 parts of a tannin, and adding from 3 to 10 parts of caustic soda dissolved in water.

6. The method of making vegetable glue, comprising mixing 100 parts of starch in from 190 to 400 parts of water, adding from 1 to 5 parts of a tannin and 5 parts of sodium aluminate, and adding from 3 to 10 parts of caustic soda dissolved in water.

7. The method of making vegetable glue, comprising mixing 100 parts of starch in from 190 to 400 parts of water, adding from 1 to 5 parts of a tannin, adding from 3 to 10 parts of caustic soda dissolved in water, and cooking at about 190° F. until solution has occurred.

In witness whereof, I have hereunto set my hand at Indianapolis, Indiana, this 2d day of August, A. D. one thousand nine hundred and twenty one.

GLOVER M. BIRK.